May 5, 1936.  J. P. McDONALD  2,039,488
METHOD OF FORMING STONES OF PLASTIC MATERIAL
AND SUPPLYING THE STONES WITH INDICIA
Filed Dec. 4, 1934

J. P. McDonald Inventor
By C. A. Snow & Co.
Attorneys.

Patented May 5, 1936

2,039,488

UNITED STATES PATENT OFFICE 2,039,488

METHOD OF FORMING STONES OF PLASTIC MATERIAL AND SUPPLYING THE STONES WITH INDICIA

John P. McDonald, Austin, Tex.

Application December 4, 1934, Serial No. 755,986

1 Claim. (Cl. 18—61)

This invention relates to a method of constructing stones such as tombstones, road markers or the like, of plastic material, the primary object of the invention being to provide a method of this character, which, when carried out, will produce a stone simulating the usual stone, wherein the indicia are formed by cutting or chiseling the stone.

An important object of the invention is to construct a stone of plastic material, in such a way that the indicia formed in the face of the moulded article, will have a color corresponding to chiseled stone.

Another object of the invention is to provide a stone wherein the indicia formed in the face thereof, will have sharp and regular edges, eliminating the necessity of reshaping or refinishing the edges of the completed article, since such refinished stones, which are usually refinished by patchwork, cannot be made to correspond in detail, to the original article, the resultant patchwork being very noticeable and unsightly.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
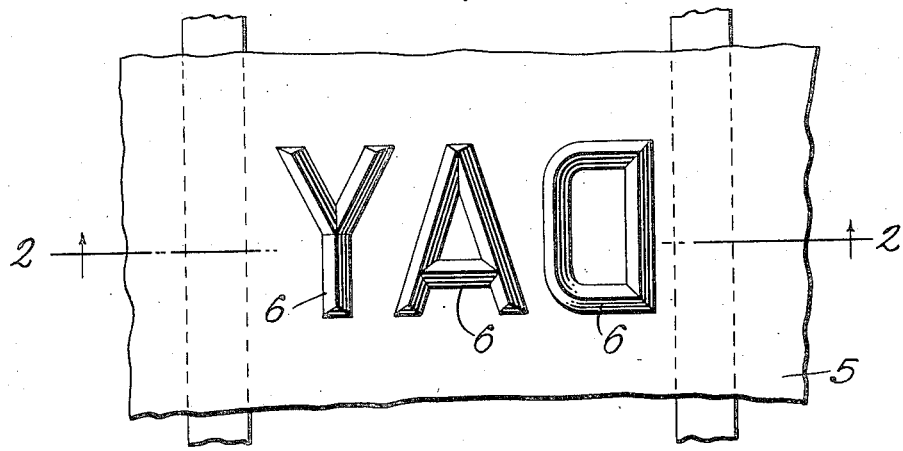
Figure 1 is a fragmental elevational view of the face plate of the mould, showing the rubber indicia as secured to the face plate.
Figure 2:
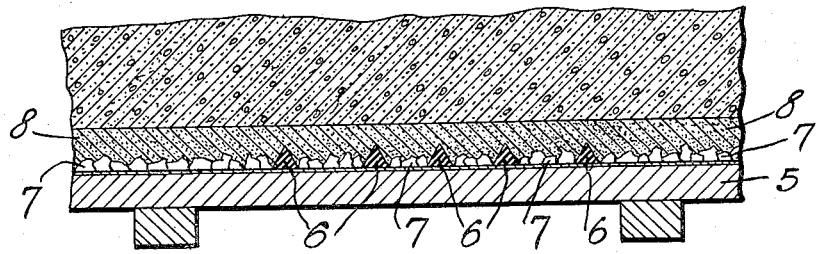
Figure 2 is a sectional view taken on line 2—2 of Figure 1.
Figure 3:
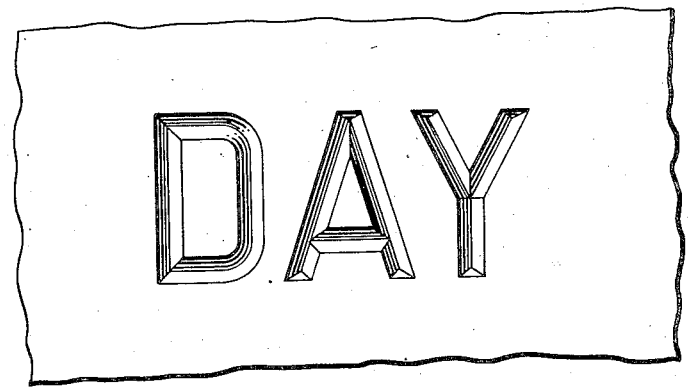
Figure 3 is a fragmental elevational view illustrating the face of the completed article.

Referring to the drawing in detail, the reference character 5 designates the face plate of the mould, and while I have shown only the face plate of the mould, it is to be understood that the face plate is employed as a part of the usual box-like mould commonly employed in the moulding of blocks, posts or the like.

Secured to the inner surface of the face plate, are rubber indicia forming members indicated by the reference character 6, the members 6 being secured in position on the face plate 5, by means of cement soluble by the action of the moisture contained in the plastic material of which the article is moulded.

In carrying out the method, the face plate 5 of the mould is supported in any suitable manner, and is supplied with a coating of adhesive material soluble by the action of moisture.

The elastic indicia forming members 6 are now properly positioned on the surface of the face plate covered with the adhesive material, to form the desired word.

Crushed granite or other stones, indicated at 7, form the face of the finished stone, and are placed on the side of the face plate supplied with adhesive material.

A layer of plastic material including sand or crushed stone of a color to simulate chiseled stone is placed between the indicia forming members, completely covering the indicia forming members, the plastic material being tamped to closely engage the indicia forming members.

After the indicia forming members and materials 7 and 8 have been properly placed, the forms of the mould not shown, are assembled and filled with suitable plastic material, such as cement concrete, which constitutes the main or body portion of the finished stone.

After the plastic material has properly set, the elastic indicia forming members 6 are removed by pulling them from their embedded positions. The indicia forming members being constructed of rubber or elastic material, will give and stretch when being pulled from the plastic material, leaving sharp and well defined edges, the surfaces of the indicia being formed by the plastic material 8, corresponding with the color of chiseled or cut stone, thereby producing a stone formed with indicia corresponding in every detail with chiseled or cut stone.

Having thus described the invention, what is claimed is:

A method of forming artificial stone having indicia on the face thereof, consisting in providing a mould having a face plate, covering one side of the face plate with adhesive material soluble by the action of moisture, placing elastic indicia forming members on the adhesive material, placing a layer of crushed granite on the adhesive material between the indicia forming members and allowing the adhesive material to dry securing the indicia forming members and crushed granite to the face plate, placing a layer of plastic material including crushed stone over the crushed granite and indicia forming members, filling the mould with cement concrete, forming the body portion of the finished stone, lifting the stone from the face plate, and finally pulling the indicia forming members from their positions in the finished stone, leaving recesses in the surface of the finished stone and forming indicia.

JOHN P. McDONALD.